(12) United States Patent
Schenkl et al.

(10) Patent No.: US 9,274,012 B2
(45) Date of Patent: Mar. 1, 2016

(54) DEVICE TO CAPTURE RELATIVE POSITION OF A COMPONENT OF WHICH THE POSITION CAN CHANGE RELATIVE TO A REFERENCE COMPONENT OF A WASHING HANDLING DEVICE, AND CORRESPONDING WASHING HANDLING DEVICE

(71) Applicant: emz-Hanauer GmbH & Co. KgaA, Nabburg (DE)

(72) Inventors: Johann Schenkl, Bodenwoehr (DE); Johannes Baumer, Fuchsberg (DE); Michael Sorgenfrei, Schwarzhofen (DE); Manfredi Signorino, Milan (IT)

(73) Assignee: emz-Hanauer GmbH & Co. KGaA, Nabburg (DE)

( * ) Notice: Subject to any disclaimer, the term of this patent is extended or adjusted under 35 U.S.C. 154(b) by 0 days.

(21) Appl. No.: 14/514,508

(22) Filed: Oct. 15, 2014

(65) Prior Publication Data
US 2015/0042220 A1 Feb. 12, 2015

Related U.S. Application Data

(63) Continuation of application No. 13/074,168, filed on Mar. 29, 2011, now Pat. No. 8,888,929.

(30) Foreign Application Priority Data

Mar. 30, 2010 (DE) .......................... 10 2010 013 386

(51) Int. Cl.
| | |
|---|---|
| *A47L 15/42* | (2006.01) |
| *G01L 1/24* | (2006.01) |
| *D06F 33/02* | (2006.01) |
| *D06F 39/00* | (2006.01) |
| *G01B 11/16* | (2006.01) |

(52) U.S. Cl.
CPC . *G01L 1/24* (2013.01); *D06F 33/02* (2013.01); *D06F 39/002* (2013.01); *D06F 39/003* (2013.01); *D06F 39/004* (2013.01); *G01B 11/16* (2013.01); *D06F 2202/12* (2013.01)

(58) Field of Classification Search
CPC ..... D06F 39/004; D06F 33/02; D06F 39/003; A47L 15/4297; A47L 2401/10
USPC .......... 134/18, 113, 56 R, 137, 117, 42, 57 R, 134/58 R; 68/12.02, 12.06, 23.1, 12.04, 68/12.27, 12.05, 13 R, 140, 19.2, 12.01, 68/139, 24, 3 R; 356/614, 339, 51, 442, 356/364, 138, 213, 317, 318, 33, 341, 620
See application file for complete search history.

(56) References Cited

U.S. PATENT DOCUMENTS

| | | | |
|---|---|---|---|
| 5,713,221 A * | 2/1998 | Myers et al. ................. | 68/12.06 |
| 2003/0130760 A1* | 7/2003 | Abraham et al. ............. | 700/213 |
| 2010/0129739 A1* | 5/2010 | Hidaka et al. ................ | 430/30 |

*Primary Examiner* — Michael Barr
*Assistant Examiner* — Thomas Bucci
(74) *Attorney, Agent, or Firm* — Robert R. Deleault, Esq.; Mesmer & Deleault, PLLC

(57) ABSTRACT

A sensor device to measure a force or pressure in a washing handling apparatus includes a light source, a light receiver, a light-reflecting surface that reflects light emitted by the light source toward the light receiver, and one or more spring elements that biases the light-reflecting surface into a predefined initial position with respect to the light source and the light receiver where the light-reflecting surface is disposed to be displaceable with respect to the light source and the light receiver in response to application of an external force or pressure against a resetting force of the one or more spring elements.

13 Claims, 4 Drawing Sheets

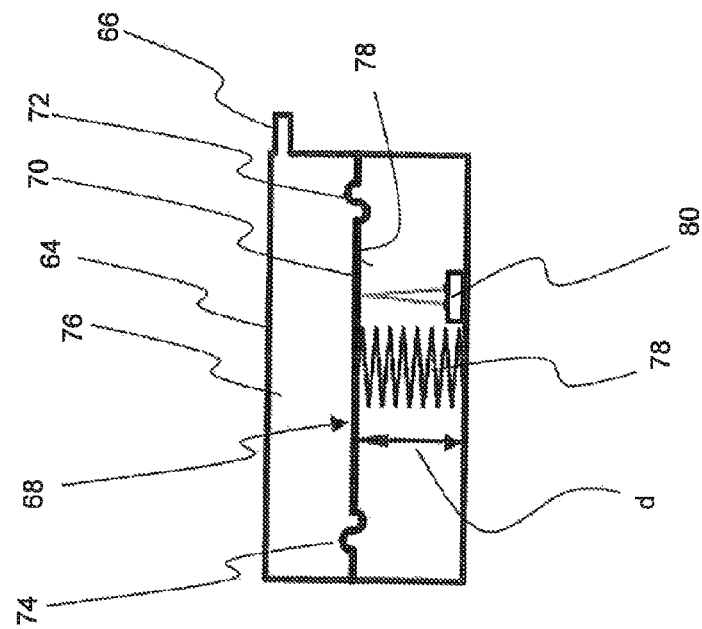
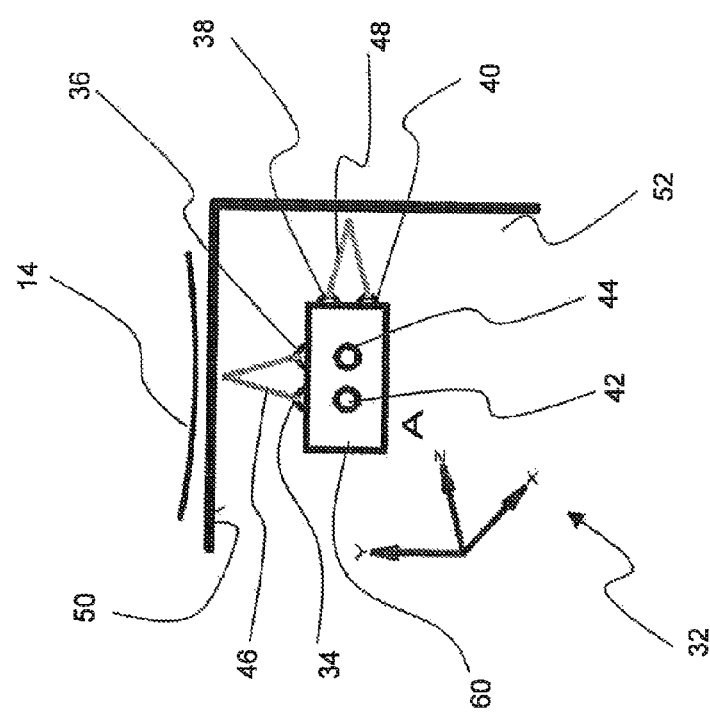

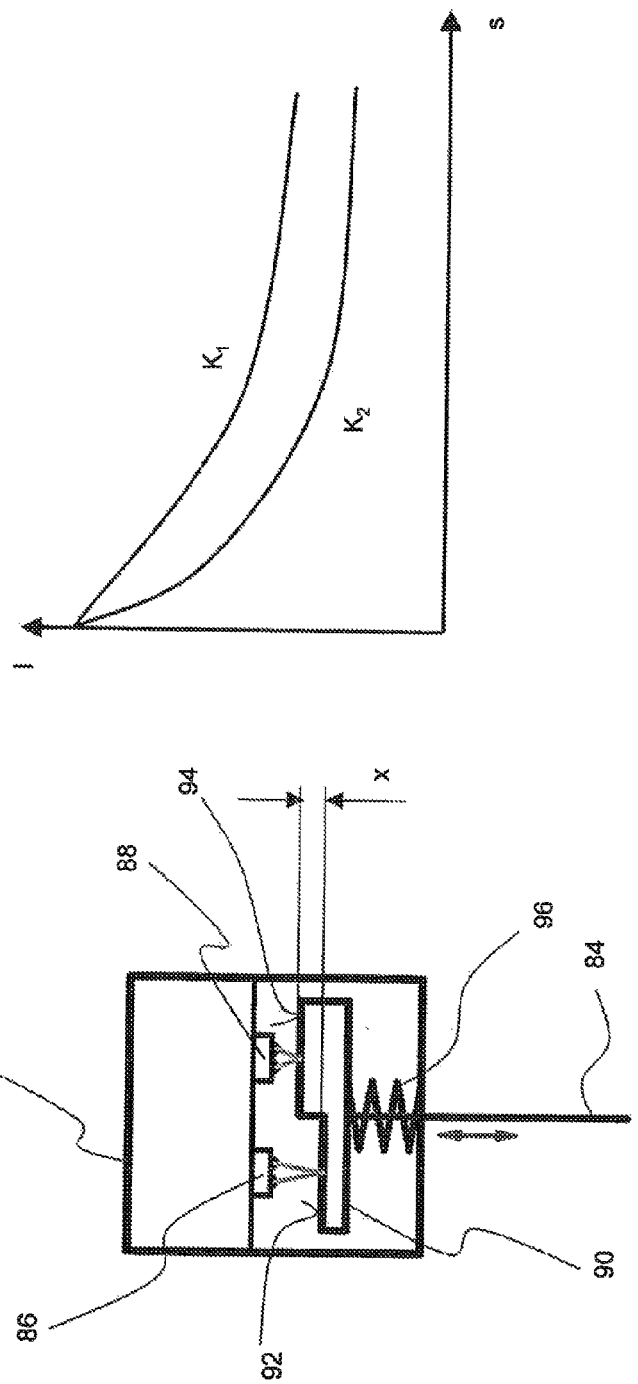

`US 9,274,012 B2`

DEVICE TO CAPTURE RELATIVE POSITION OF A COMPONENT OF WHICH THE POSITION CAN CHANGE RELATIVE TO A REFERENCE COMPONENT OF A WASHING HANDLING DEVICE, AND CORRESPONDING WASHING HANDLING DEVICE

BACKGROUND OF THE INVENTION

This invention concerns a device to capture the relative position of a component of which the position can change relative to a reference component of a washing handling device, in particular a washing machine or drier, and a corresponding washing handling device.

Such devices are known in various forms from the prior art. Thus the document DE 101 04 682 A1 shows a capacitive sensor, with which the axial distance of a tub relative to the housing of a washing machine is provided for the purpose of determining an imbalance, deflection in operation and the present loading of the washing drum. This solution has the disadvantage that capacitive sensors, in the context of the distances to be measured, are relatively difficult to evaluate, and are also subject to electromagnetic interference effects of the environment.

Another arrangement is known from the document DE 103 34 572 B3. In the case of the arrangement described in this document, a coil-based electromagnetic travel sensor is used to capture the deflection of the tub relative to the housing. Such electromagnetic travel sensors too are subject to interference effects and wear problems.

The document DE 698 07 055 T3 describes a washing machine where the present drum deflection and loading are determined using a Hall element and a magnet body associated with it. In this case, there is the problem that Hall sensors too are subject to electromagnetic interference, and to obtain sufficiently good measurement results, large, homogeneous magnets are required. Use of Hall sensors also has the disadvantage that to determine the present position in space, 3 field vectors are always required. Use of a single dipole magnet is not enough, since its field component is not biunique.

In the document DE 199 60 847 A1, the possibility of using strain gauges to determine the position of the tub in the housing of a washing machine is described. To evaluate the signals provided by strain gauges, relatively expensive and sensitive amplifier and compensation circuits are required.

The document DE 10 2004 043 752 B4 describes a measuring device with optical sensors to determine the present deflection of an axis of rotation of a washing drum relative to the tub of a washing machine. The optical system described in it has the disadvantage that it must be integrated into the bearing arrangement of the drum, and this is structurally expensive.

SUMMARY OF THE INVENTION

In contrast, it is the object of this invention to provide a device which is of the type described above, is structurally simple, is insensitive to external influences in operation, and has high measurement precision.

This object is achieved by a device to capture the relative position of a component of which the position can change relative to a reference component of a washing handling device, in particular a washing machine or drier, comprising:
at least one light source,
at least one light receiver,
a light-reflecting surface, which reflects light which the light source emits to the light receiver,
the device being designed to capture the present relative position, or the distance of the changeable-position component, relative to the reference component, according to the reflected light which the light receiver captures.

According to the invention, the position of the changeable-position component, e.g. the tub of the washing handling device, relative to the reference component, e.g. the housing of the washing handling device or a component which is arranged in a fixed position in the washing handling device, is determined purely optically on the basis of the light reflection and the light intensity which is captured from it. The reflecting surface can be a surface of a separate component, or be integrated into an existing component, e.g. a tub. Such optical determination of position is possible using relatively inexpensively available components. It is not subject to any electromagnetic interference effects. No mechanical components which are moved relative to each other, and can be subject to wear, are required. By suitable formation of the beam path or reflection path or reflecting surfaces, permanently reliable results can be achieved. Thus reflection patterns, e.g. a kind of reflection grid of reflecting and non-reflecting areas, can be used. It is also possible to use convexly or concavely curved reflecting surfaces, in particular spherically curved reflecting surfaces. Similarly, it is also possible to use stepped reflecting surfaces, or ones which are alternately convexly and concavely curved in sub-regions, e.g. for generating Fresnel structures, which make distance measurement easier.

A further development of the invention provides that the reflecting surface is in the form of a scattering reflecting surface, which reflects and scatters the light which the light source emits.

According to the invention, it can also be provided that the light source is in the form of a light-emitting diode (LED), a laser diode or an infrared light source or similar. It is also possible to arrange the light source at a greater distance from the measuring point, and to guide the light to the measuring point via an optical waveguide. According to the invention, it can also be provided that the light receiver is in the form of a phototransistor, photodiode, photoresistor, passively operated LED or similar. Such light sources and light receivers are available inexpensively.

By pulsed control of the light source and/or light receiver, interference effects by external light can be determined and filtered out. Polarised light can also be used.

To simplify the structure of the solution according to the invention, it can be provided that at least one pair of light source and light receiver are combined next to each other in one module. Here it must be stated that the measured distance is always greater than the distance of light source and light receiver which are arranged next to each other.

In relation to this, according to a further development of the invention, it can be provided that at least two pairs of light source and light receiver, which are arranged at different alignments to each other, are arranged. It is thus possible to arrange such modules of pairs of light source and light receiver at different positions or/and with different alignment in the washing handling device, and thus to capture reliably relative movements between the changeable-position component and the reference component, in particular with reference to the housing, along different spatial axes.

According to the invention, it can also be provided that around a light source, multiple receivers are arranged, e.g. on two sides of the light source, or at regular angular distances around the light source, e.g. at an angular distance of 120°. In this way it is possible to improve the determination of position, e.g. by capturing a relative tilt. It is also possible to compensate for measurement errors. In this way, positions can also be captured more easily in three dimensions.

According to the invention, it can also be provided that the light-reflecting surfaces are arranged at an angle to each other. It is thus possible to provide two or three pairs of light source and light receiver, in a perpendicular arrangement to each other, and fixed in the housing, and to assign reflecting surfaces which are correspondingly perpendicularly aligned to each other to them. In this way, movements which are orthogonal to the reflecting surfaces can be determined.

Additionally, according to a further development of the invention, it can be provided that the distance of the pairs of light source and light receiver relative to the light-reflecting surface assigned to them is different. In other words, a pair of light source and light receiver can be arranged in an initial state at a first distance from the light-reflecting surface assigned to them, and another pair of light source and light receiver can be arranged in an initial state at a second distance from the light-reflecting surface assigned to them, the two light-reflecting surfaces being coupled to each other. In this way, when the light reflection which the two light receivers determine is evaluated, on the basis of the known difference of distance between the first and second distances, a plausibility check and compensation of the measurement result can be carried out. Preferably, the orientations of the two pairs of light source and light receiver are essentially aligned.

An alternative version of the invention provides that instead of using multiple light sources, the light which a single light source emits is divided via a beam splitter, e.g. a prism or double-hole screen, into multiple light beams or pencils of rays, and radiated onto different light-reflecting surfaces at different distances or/and different alignments to the light source. The evaluation can then take place via corresponding light receivers, in the manner described above, and with the advantages described above.

To measure pressure or force in a washing handling device, according to the invention a spring arrangement, which is arranged so that it prestresses at least one pair of light source and light receiver and the light-reflecting surface into a predetermined initial position relative to each other, and is deformed on deflection, can also be provided. On the basis of the captured pressure or captured force and of the distance which changes depending on the pressure or force, for example the fullness of a washing drum with water can be determined.

On the basis of the captured force (weight) which is exerted by a load of washing on a drum or tub or its suspension, for example the quantity or mass of introduced washing can also be determined.

The invention also concerns a washing handling device, in particular a washing machine or drier, comprising:
a housing,
a changeable-position component, which is carried movably in the housing, and
a device of the kind described above,
wherein on one component out of housing or changeable-position component, a sensor arrangement with at least one pair of light source and light receiver is arranged, and on the other component out of housing and changeable-position component, the light-reflecting surface is arranged, and the present relative position of the changeable-position component relative to the housing can be determined according to the light reflection which the light receiver captures.

The light-reflecting surface can be in the form of a surface of a separate component, or in the form of an integrated surface of a component of the washing handling device, e.g. the tub. As the housing, for example the housing of the washing handling device, or a component arranged within the washing handling device, can be used. It is also possible to attach the sensor arrangement to the tub, and the light-reflecting surface to the housing of the washing handling device.

According to the invention, it can also be provided that the changeable-position component is a tub in which a washing drum is rotatably carried, the tub being suspended in the housing so that its position can change. In relation to this, according to the invention it is possible that the tub is carried in the housing by means of at least one passive or actively controllable damper, and in the latter case the damper characteristic can be adjusted according to the captured relative position of the drum receptacle in the housing.

Alternatively, according to the invention, it can be provided that the changeable-position component is a membrane which is prestressed by a spring and can be shifted in a housing, and which closes and seals a pressure chamber in the housing, it being possible to capture the relative position of the membrane relative to the housing according to the captured light reflection, taking account of the compression state of the spring. According to the present pressure in the pressure chamber, the membrane is deflected to a greater or lesser extent against the spring force, compared with a pressure-free initial state. This deflection is captured on the basis of the light reflection. Taking account of the spring characteristic, in particular the spring constant, and the known area of the membrane, conclusions can thus be drawn about the pressure in the pressure chamber. This pressure can give information about the present fullness of the tub with water or lye, for example.

According to another embodiment of the invention, it can be provided that the changeable-position component is a force sensor which is prestressed by a spring. Again, on the basis of the captured light reflection and the compression of the spring associated with it, and taking account of the spring characteristic, conclusions can be drawn about the force acting on the spring. In this way, for example, it is possible to determine what quantity of washing was introduced into the drum, and/or how much water or lye is in the tub.

According to the magnitudes which are captured using the device according to the invention, the operating mode, e.g. the spin speed, the quantity of water to be fed in, the damper characteristic of the actively controllable damper, etc. of the washing handling device can be adjusted.

BRIEF DESCRIPTION OF THE DRAWINGS

The invention is explained using an example, on the basis of the attached figures, of which:
FIG. 2 is an enlarged schematic view of the measuring device according to FIG. 1;
FIG. 3 is an enlarged view of a measuring device according to the invention, to capture pressure;
FIG. 4 is an enlarged view of a measuring device according to the invention, to capture force;
FIG. 5 is a diagram to explain the operation of the force measuring device according to FIG. 4.

DETAILED DESCRIPTION OF THE PREFERRED EMBODIMENT

Figure 1:
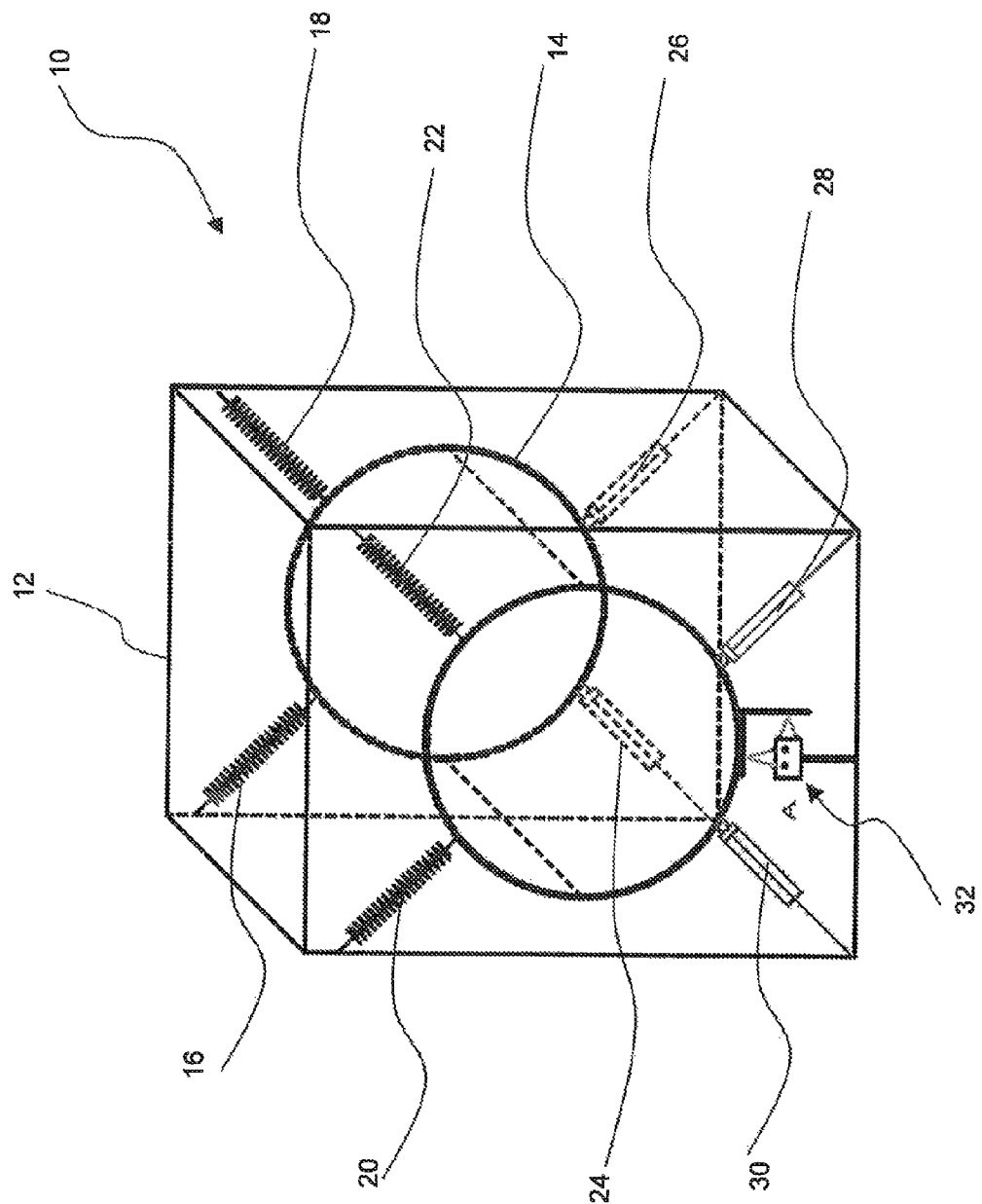
FIG. 1 is a schematic drawing of a washing machine according to the invention.

In FIG. 1, a washing machine according to the invention is shown schematically, and identified as a whole by 10. This comprises a housing 12, in which a tub 14 is displaceably suspended. For suspension, four springs 16, 18, 20, 22, which hold the tub 14 elastically in the upper housing region, are used. The tub 14 is carried by four dampers 24, 26, 28, 30 in the lower housing region. The dampers 24, 26, 28, 30 can be passive or actively controllable, and in the latter case, of active control, their damper characteristic can be changed.

The washing machine 10 also comprises a measuring device 32 to capture the position of the tub 14 relative to the housing 12. This measuring device 32 is shown enlarged in FIG. 2.

It comprises three pairs of light source and light receiver, namely a first pair 34, 36, a second pair 38, 40 and a third pair 42, 44. Each of the light sources 34, 38, 42 emits a light beam 46, 48. These light beams are scattered and reflected at the scattering reflecting surfaces 50, 52 facing the pairs of light source and light receiver, so that depending on the present distance between the scattering reflecting surface and the light receiver 36, 40, 44, at each light receiver 36, 40, 44 reflected (scattered) light can be captured with a definite intensity which represents the present distance. The third scattering reflecting surface, facing the pair 42, 44, is not shown in the figure. If the distance between light receiver 36, 40, 44 and associated scattering reflecting surface changes, the light intensity which the light receiver 36, 40, 44 captures also changes.

With the measuring arrangement 32, any deflections of the tub 14, the scattering reflecting surfaces 50, 52 and the third scattering reflecting surface (not drawn) which are permanently coupled to it relative to the module 60, which is fixed in position and carries the pairs of light source and light receiver, can be captured in real time. In other words, with the measuring arrangement 32 the present position (along all three spatial axes) of the tub 14 in the housing 12 of the washing machine 10 can be captured. This optical capture is to a large extent free of interference effects such as mechanical wear, electromagnetic interference fields, etc. If necessary, the deflection along the spatial axes X, Y and Z shown in FIG. 2 can be measured sequentially, i.e. in a time sequence, so that even mutual interference effects of the individual pairs of light source and light receiver can be prevented. Alternatively, light which is polarised specifically for each measurement direction can be used.

To improve the measurement result, according to the invention optical components such as lenses, screens or filters can be used.

FIG. 3 shows the principle of the measuring device according to the invention, as used with a pressure sensor 62. The pressure sensor 62 comprises a housing 64 with a pressure connection, inlet and/or outlet 66. In the housing 64, a movable membrane 68, which has an area 70 of which the shape is stable, said area 70 being attached to the housing 64 via flexible areas 72, 74 so that it is sealed but displaceable, is arranged. The membrane 68 delimits a pressure chamber 76. The membrane 68 is prestressed into an initial position via a compression spring 78 into the pressure chamber 76. On its side facing away from the pressure chamber 76, it has a scattering reflecting surface 78.

On the side of the membrane 68 facing away from the pressure chamber 76, on the housing 64 a module 80 with a pair of light source and light receiver is arranged, and as described in relation to FIG. 2, it emits a light beam to the membrane, and receives scattered reflected light from the membrane. The distance d, which is given by the measurement result which the module 80 determines regarding the light intensity, describes the present compression state of the compression spring 78 relative to an initial state D. From this, taking account of the known spring constant c of the compression spring 78, according to Hooke's Law ($F=c*[D-d]$) the spring force F which is exerted on the compression spring 78 can be calculated directly.

Once the movable area A of the membrane 68 is also known, the pressure p in the pressure chamber 76 can be calculated directly from the determined spring force F and the relation $p=F/A$.

With the solution according to the invention shown in FIG. 3, a contactless pressure sensor, which can be used inexpensively in washing handling devices such as washing machines or driers, can be implemented in a technically simple way.

FIG. 4 shows another embodiment of the invention, but implemented as a force sensor. In a housing 82, a measuring rod 84 is displaceably received. In the housing 82, fixed in the housing, a first measuring sensor 86 and a second measuring sensor 88 are attached, each measuring sensor having a pair of light source and light receiver. A reflecting surface carrier 90, which has two reflecting surfaces 92, 94, is coupled to the measuring rod 84. They are essentially parallel to each other, but offset by a distance x. The reflecting surface carrier 90 is prestressed via a compression spring 96 into an initial position. Depending on the deflection of the reflecting surface carrier 90 relative to the housing 82, the result at the measuring sensors 86, 88 is different intensities of the reflected light at the reflecting surfaces 92, 94, so that conclusions can be drawn about the present position of the reflecting surface carrier 90 and thus of the measuring rod 84.

Again, on the basis of Hooke's Law ($F=c*[D-d]$) the spring force F which is exerted on the compression spring 96 can be calculated directly. For example, if the measuring rod 84 is coupled to the tub 14, it is possible to determine from this with what quantity/mass of washing or/and lye the tub 14 is filled.

On the basis of the reflecting surfaces 92, 94, which are offset from each other, the result is two different curves $K_1$, $K_2$ for the intensities I of reflected light, as measured by the measuring sensors 86, 88. This provides the possibility of a plausibility check, since the measurement results can always be compared with each other. This also provides the possibility of calibration and compensation of the measuring system taking account of the known offset x, e.g. by coefficient formation and/or normalisation. The evaluation can also be simplified in this way. The light intensity I, as is known, falls with the square of the travelled distance x ($I \sim 1/x^2$). In the case of quotient formation, instead of quadratic relations linear ones are obtained, which simplifies the computational evaluation.

Figure 6:
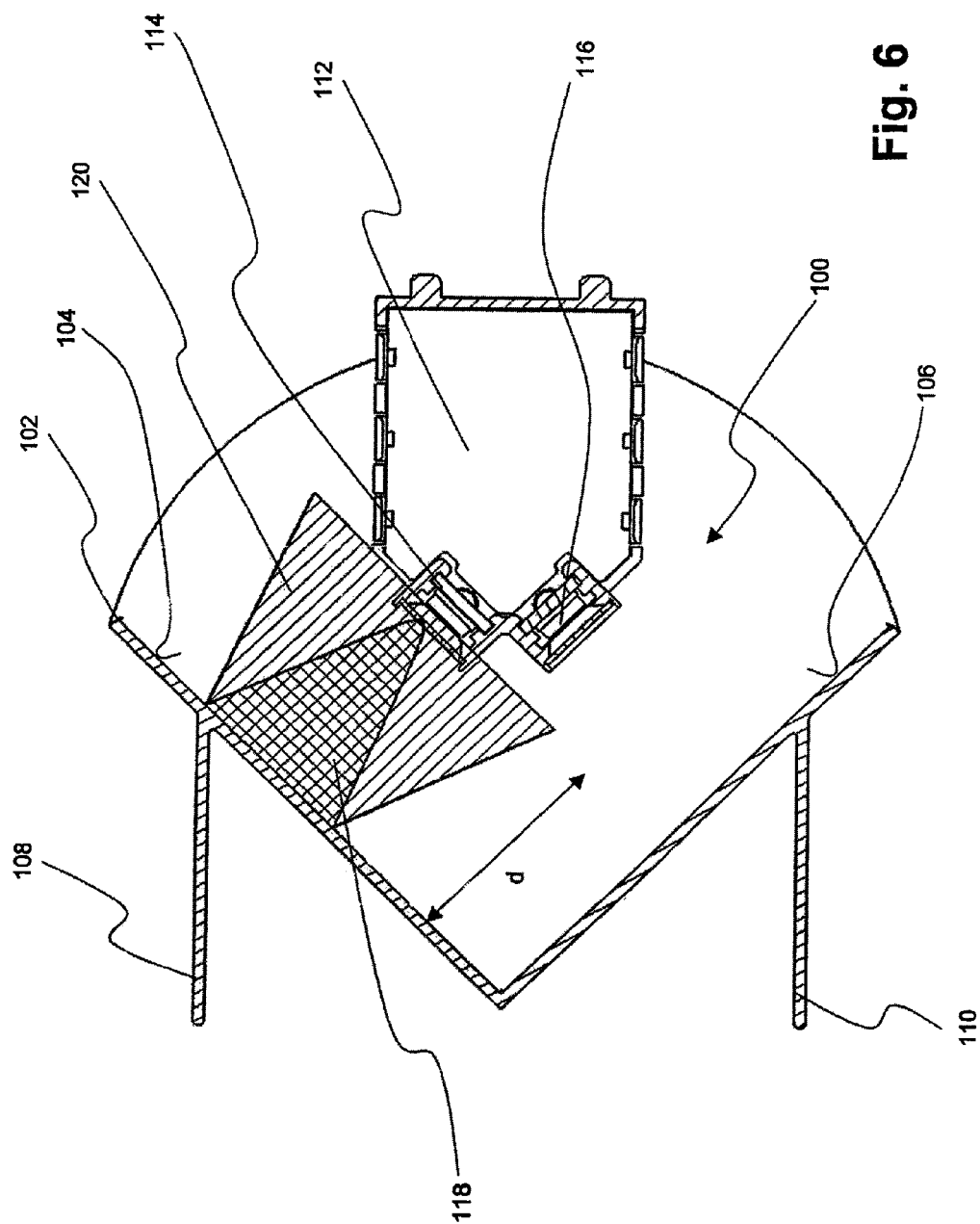
FIG. 6 is a schematic representation to explain the measuring process with an embodiment according to the invention.

Finally, FIG. 6 shows a possible arrangement of a measuring device 100 according to the invention in a washing machine, for 2 axes. A reflecting surface carrier 102, with reflecting surfaces 104, 106 arranged perpendicularly to each other, is attached in a way not shown to a tub, via fixing strips 108, 110. A measuring sensor arrangement 112, with two measuring sensors 114, 116 arranged orthogonally to each other, emits a pencil of rays 118. This is reflected and scattered at the reflecting surface 104, as shown by the pencil of rays 120. Depending on the distance d, the result is a light intensity, which is captured by the sensor arrangement 114. In this way, the present relative position between the fixed measuring sensor arrangement 112 and the reflecting surface carrier 102, which is movable with the tub, can be determined. This measuring principle can be extended directly for the third spatial axis.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A sensor device to measure a force or pressure in a washing handling apparatus, the sensor device comprising:
   a light source;
   a light receiver;
   a light-reflecting surface that reflects light emitted by the light source toward the light receiver; and
   one or more spring elements that biases the light-reflecting surface into a predefined initial position with respect to the light source and the light receiver,
   wherein the light-reflecting surface is disposed to be displaceable with respect to the light source and the light receiver in response to application of an external force or pressure against a resetting force of the one or more spring elements to thereby change a distance of the light-reflecting surface relative to the light source and the light receiver,
   wherein the device is configured to determine the applied external force or pressure based on reflected light captured by the light receiver.

2. The sensor device of claim 1 wherein the one or more spring elements include a compression spring disposed to be compressed in response to application of the external force or pressure.

3. The sensor device of claim 1 wherein the device is configured to determine the applied external force or pressure based on the reflected light captured by the light receiver and further based on a spring constant of the one or more spring elements and Hooke's law.

4. The sensor device of claim 1 wherein the reflected light captured by the light receiver decreases in a measured intensity as the applied external force increases.

5. The sensor device of claim 1 further comprising:
   a housing accommodating the light source and the light receiver and having an interior;
   a measuring rod extending from the housing interior to outside the housing and disposed to be displaceable with respect to the housing, the measuring rod having an end portion located in the housing interior; and
   a reflecting surface carrier coupled to the end portion of the measuring rod and carrying the light-reflecting surface.

6. The sensor device of claim 5 wherein the measuring rod is coupled to a tub.

7. The sensor device of claim 1 wherein the reflecting surface is a scattering reflecting surface.

8. The sensor device of claim 1 wherein the light source is configured to emit polarized light.

9. The sensor device of claim 1 wherein the light source is one of a light-emitting diode, a laser diode and an infrared light source.

10. The sensor device of claim 1 wherein the light receiver is one of a phototransistor, a photodiode and a passively operated light-emitting diode.

11. The sensor device of claim 1 wherein the light source and the light receiver are combined next to each other in one module.

12. A washing machine comprising:
   a machine housing;
   a tub suspended in the machine housing;
   a plurality of springs to support the tub elastically with respect to the machine housing;
   a sensor device to measure a force exerted on at least one of the plurality of springs, the sensor device comprising:
      a light source;
      a light receiver;
      a light-reflecting surface that reflects light emitted by the light source toward the light receiver, the light-reflecting surface disposed to be elastically displaceable with respect to the light source and the light receiver in response to application of a force acting upon the at least one of the plurality of springs against a resetting force thereof, to thereby change a distance of the light-reflecting surface relative to the light source and the light receiver,
      wherein the device is configured to determine the applied force based on reflected light captured by the light receiver.

13. The washing machine of claim 12 wherein the sensor device includes:
   a sensor housing accommodating the light source and the light receiver and having an interior;
   a measuring rod extending from the interior to outside the sensor housing and disposed to be displaceable with respect to the sensor housing, the measuring rod having an end portion located in the interior; and
   a reflecting surface carrier coupled to the end portion of the measuring rod and carrying the light-reflecting surface,
   wherein the measuring rod is coupled to the tub.

* * * * *